United States Patent
Dardona et al.

(10) Patent No.: US 9,939,247 B1
(45) Date of Patent: Apr. 10, 2018

(54) EMBEDDED SENSOR FOR IN-SITU MONITORING OF BLADE TIP INCURSION

(71) Applicant: United Technologies Corporation, Farmington, CT (US)

(72) Inventors: Sameh Dardona, South Windsor, CT (US); Paul Sheedy, Bolton, CT (US); Marcin Piech, East Hampton, CT (US); Daniel Anthony Grande, West Hartford, CT (US); Wayde R. Schmidt, Pomfret Center, CT (US); Cagatay Tokgoz, Beaumont, TX (US); Thomas D. Kasprow, Glastonbury, CT (US); Lesia V. Protsailo, Bolton, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/368,963

(22) Filed: Dec. 5, 2016

(51) Int. Cl.
*G01M 15/14* (2006.01)
*G01B 7/26* (2006.01)

(52) U.S. Cl.
CPC ............... *G01B 7/26* (2013.01); *G01M 15/14* (2013.01)

(58) Field of Classification Search
CPC ... G01M 99/00; G01M 5/0033; G01M 99/002
See application file for complete search history.

(56) References Cited

U.S. PATENT DOCUMENTS

| | | | |
|---|---|---|---|
| 6,318,147 B1 * | 11/2001 | Steinruck ............... | G01D 5/485 73/114.78 |
| 6,487,491 B1 | 11/2002 | Karpman et al. | |
| 7,270,890 B2 | 9/2007 | Sabol et al. | |
| 7,582,359 B2 | 9/2009 | Sabol et al. | |
| 7,618,712 B2 | 11/2009 | Sabol et al. | |
| 7,658,588 B1 | 2/2010 | Schopf et al. | |
| 8,132,467 B2 | 3/2012 | Shinde et al. | |
| 2003/0066623 A1 * | 4/2003 | McLean ................... | C23C 2/14 165/11.1 |
| 2015/0081166 A1 * | 3/2015 | Diekevers .............. | B62D 55/14 701/34.4 |

* cited by examiner

*Primary Examiner* — Jermele M Hollington
*Assistant Examiner* — Alvaro Fortich
(74) *Attorney, Agent, or Firm* — Carlson, Gaskey & Olds, P.C.

(57) ABSTRACT

A wear monitoring system for measuring incursion depth into an abradable coating includes a layer of abradable coating including a depth. At least one measurement circuit includes a plurality of conductive leads disposed within the abradable coating. The conductive leads are spaced radially apart within a common radial plane corresponding to the depth of the abradable coating. A plurality of resistor elements corresponds with the plurality of conductive leads. Each of the plurality of resistor elements are in electrical communication with one of the plurality of conductive leads disposed within the common radial plane of the corresponding one of the plurality of conductive leads. An electrical characteristic of the circuit varies responsive to cutting of one or more of the plurality of conductive leads by a passing airfoil. A gas turbine engine and method are also disclosed.

24 Claims, 5 Drawing Sheets

US 9,939,247 B1

EMBEDDED SENSOR FOR IN-SITU MONITORING OF BLADE TIP INCURSION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Abradable coatings are utilized in compressor and turbine sections on inner surfaces of a casing proximate a rotating airfoil. The abradable coating is utilized where minimizing clearances between a static casing structure and the tip of a compressor or turbine blade is desirable to increase engine efficiency. The abradable coatings are worn away by abrasive tips in the compressor and turbine sections to provide the desired clearance. The abradable coating not only provides closer clearances but also adjusts those clearances during engine operation to accommodate changes due to loading and thermal changes. While some level of wear can be estimated based on engine operation, such estimates of incursion depths of an airfoil tip into the abradable coating may not be as accurate as desired. The depth of incursion into an abradable coating as well as dynamic changes in abradable coating wear provides information that can be utilized to determine abradable coating depths and to monitor engine operating efficiencies and changes.

Turbine engine manufacturers continue to seek further improvements to engine performance including improvements to thermal, transfer and propulsive efficiencies.

SUMMARY

In a featured embodiment, a wear monitoring system for measuring incursion depth into an abradable coating includes a layer of abradable coating including a depth. At least one measurement circuit includes a plurality of conductive leads disposed within the abradable coating. The conductive leads are spaced radially apart within a common radial plane corresponding to the depth of the abradable coating. A plurality of resistor elements corresponds with the plurality of conductive leads. Each of the plurality of resistor elements are in electrical communication with one of the plurality of conductive leads disposed within the common radial plane of the corresponding one of the plurality of conductive leads. An electrical characteristic of the circuit varies responsive to cutting of one or more of the plurality of conductive leads by a passing airfoil.

In another embodiment according to the previous embodiment, each of the plurality of resistor elements are arranged in parallel.

In another embodiment according to any of the previous embodiments, at least two of the plurality of resistor elements provide a different resistance.

In another embodiment according to any of the previous embodiments, includes at least two probes in electrical communication with the plurality of conductive leads and the corresponding plurality of resistor elements.

In another embodiment according to any of the previous embodiments, each of the resistor elements includes a resistor element material dispersed between end leads corresponding with the corresponding one of the plurality of conductive leads.

In another embodiment according to any of the previous embodiments, a volume of the resistor element material between the end leads is varied to define a resistance value for each of the plurality of resistor elements.

In another embodiment according to any of the previous embodiments, the resistor element material between the end leads defines a uniform cross-section and a portion of resistor element materials with a non-uniform cross-section extends past each of the end leads.

In another embodiment according to any of the previous embodiments, the measurement circuit is formed on an insulating layer and an encapsulating layer is applied over the measurement circuit. Each of the insulating layer, measurement circuit and encapsulating layers are disposed within separate and parallel radially extending planes.

In another embodiment according to any of the previous embodiments, includes a controller in communication with the measurement circuit that receives information indicative of an incursion of an airfoil into the radial depth of the abradable material.

In another featured embodiment, a gas turbine engine includes a fan including a plurality of fan blades rotatable about an axis. A compressor section is also included. A combustor is in fluid communication with the compressor section. A turbine section is in fluid communication with the combustor. At least one of the compressor section and the turbine section includes an airfoil having a tip. An abradable coating that wears away responsive to incursion of the tip to define a desired clearance. A wear sensor system includes at least one measurement circuit including a plurality of conductive leads disposed within the abradable coating. The conductive leads are spaced radially apart within a common radial plane corresponding to the depth of the abradable coating. A plurality of resistor elements correspond with the plurality of conductive leads. Each of the plurality of resistor elements in electrical communication with one of the plurality of conductive leads and disposed within the common radial plane of the corresponding one of the plurality of conductive leads. An electrical characteristic of the at least one measurement circuit varies responsive to cutting of one or more of the plurality of conductive leads by the tip.

In another embodiment according to the previous embodiment, each of the plurality of resistor elements are arranged in parallel.

In another embodiment according to any of the previous embodiments, at least two of the plurality of resistor elements provide a different resistance.

In another embodiment according to any of the previous embodiments, includes at least two probes in electrical communication with the plurality of conductive leads and the corresponding plurality of resistor elements.

In another embodiment according to any of the previous embodiments, each of the resistor elements includes a resistor element material dispersed between end leads corresponding with the corresponding one of the plurality of conductive leads.

In another embodiment according to any of the previous embodiments, a volume of the resistor element material between the end leads is varied to define a resistance value for each of the plurality of resistor elements.

In another embodiment according to any of the previous embodiments the resistor element material between the end leads defines a uniform cross-section and a portion of resistor element materials with a non-uniform cross-section extends past each of the end leads.

In another embodiment according to any of the previous embodiments the measurement circuit is formed on an insulating layer applied over the abradable material and an encapsulating layer is applied over the measurement circuit. Each of the insulating layer, measurement circuit and encapsulating layers are disposed within separate and parallel radially extending planes.

In another embodiment according to any of the previous embodiments, includes a controller in communication with the measurement circuit that receives information indicative of an incursion of an airfoil into the radial depth of the abradable material.

In another featured embodiment, a method of assembling a wear sensor system for monitoring wear of an abradable coating includes applying a layer of abradable coating to a desired radial depth proximate an airfoil. A plurality of conductive leads formed are disposed within the abradable coating. The conductive leads spaced radially apart within a common radial plane corresponding to the radial depth of the abradable coating. A plurality of resistor elements assembled correspond with the plurality of conductive leads. Each of the plurality of resistor elements are in electrical communication with one of the plurality of conductive leads and disposed radially outward within the common radial plane of the corresponding one of the plurality of conductive leads. Probes are provided in electrical communication with the plurality of conductive leads and the plurality of resistor elements such that an electrical characteristic varies responsive to cutting of one or more of the plurality of conductive leads by an airfoil and that the electrical characteristic is indicative of a depth at which the airfoil has penetrated the radial depth of the abradable coating.

In another embodiment according to the previous embodiment, includes applying of an insulating coating onto the abradable coating along a radial plane and forming the plurality of conductive leads and the plurality of resistor elements onto the insulating coating.

In another embodiment according to any of the previous embodiments, includes applying an encapsulating coating over the plurality of conductive leads and the plurality of resistor elements.

In another embodiment according to any of the previous embodiments, includes defining each of the resistor elements with a resistor element material dispersed between end leads corresponding with the corresponding one of the plurality of conductive leads.

In another embodiment according to any of the previous embodiments, a volume of the resistor element material between the end leads is varied to define a resistance value for each of the plurality of resistor elements.

In another embodiment according to any of the previous embodiments, the resistor element material between the end leads defines a uniform width and a portion of resistor element materials with a non-uniform width extends past each of the end leads.

DETAILED DESCRIPTION

Figure 1:
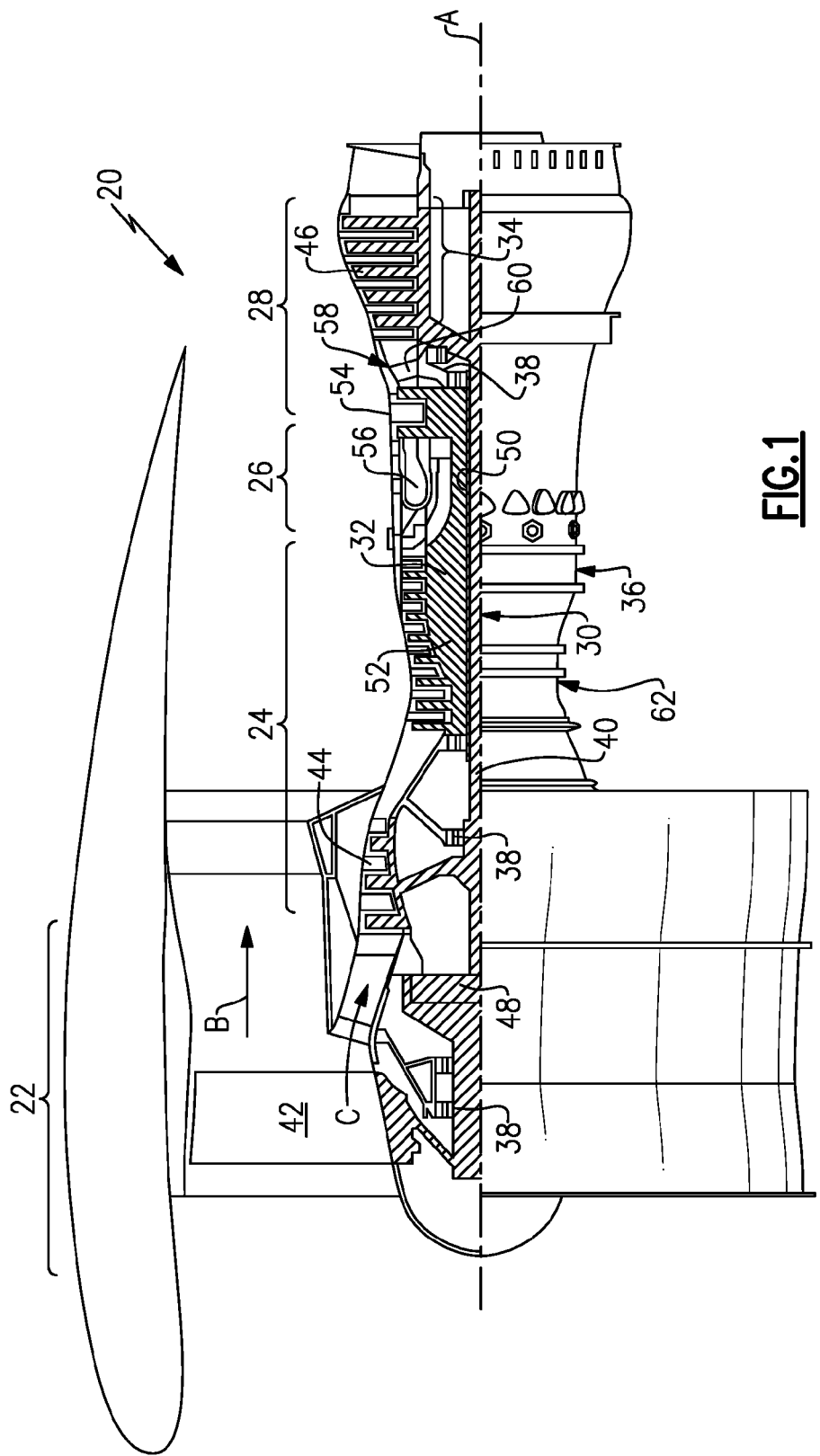
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The engine static structure 36 includes a compressor casing 62. The compressor casing 62 circumscribes a plurality of airfoils that drive air along the core flow path C.

Figure 2:
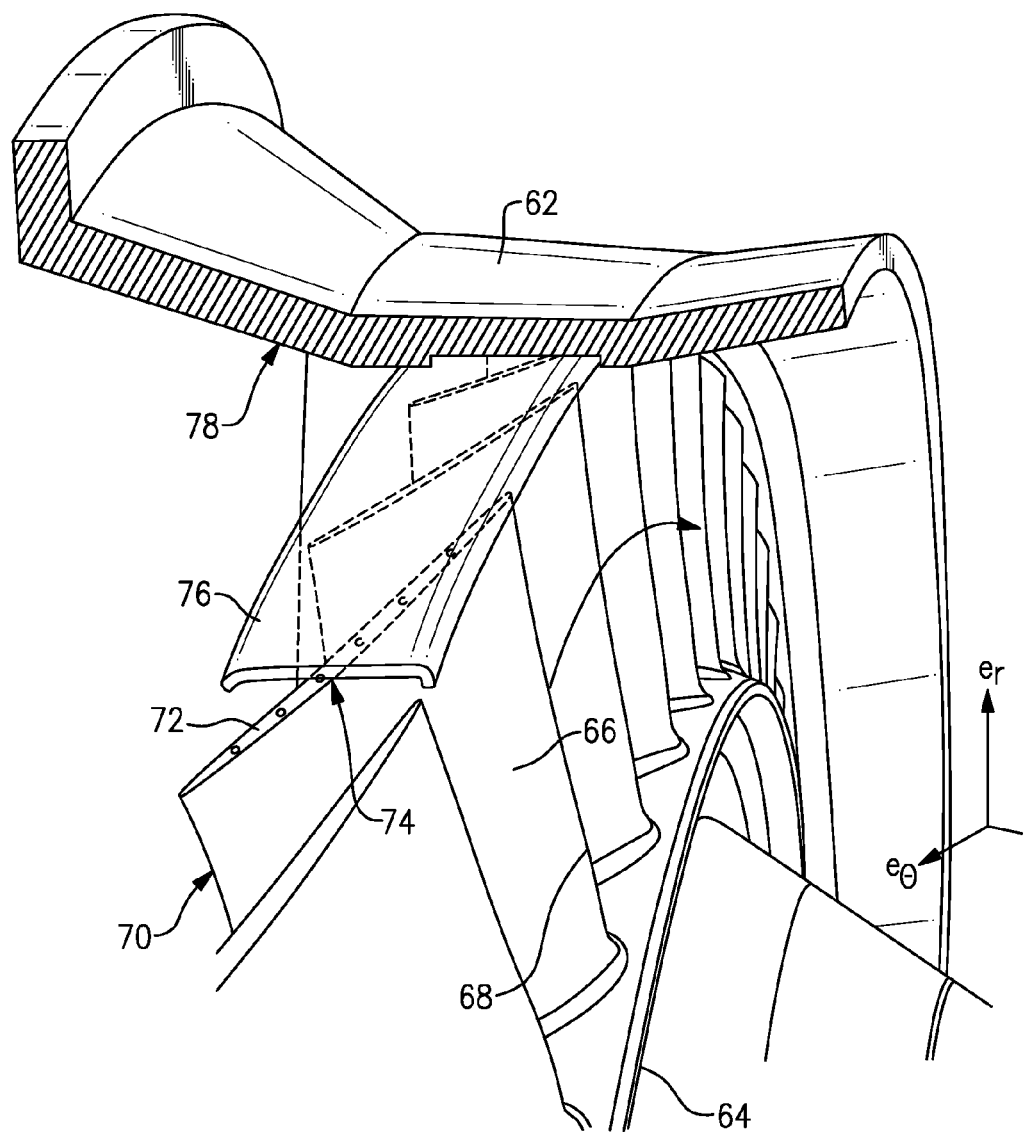
FIG. 2 is a perspective view of a compressor section of the example gas turbine engine.

Referring to FIG. 2 with continued reference to FIG. 1, the compressor casing 62 circumscribes a plurality of airfoils 66. The airfoils 66 are supported for rotation about the engine axis A on a compressor disc 64. Each of the airfoils 66 includes a leading edge 68 and a trailing edge 70 and a tip 72. The tip 72 of each of the airfoils 66 rotates in close proximity to an inner surface 78 of the compressor casing 62. A clearance between each airfoil tip 72 and the inner surface 78 of the compressor casing 62 is minimized to increase compressor efficiency. As appreciated, large clearances between the airfoil tip 72 and the inner surface of the casing 78 enables air to pass around the airfoil 66 and reduces efficiency.

An abradable coating 76 is provided on the inner surface 78 approximate to the airfoil tip 72. The abradable coating 76 is worn away by the airfoils 66 to provide clearance 74 and also to accommodate changes in relative position of the casing 62 due to thermal changes and loading. The abradable coating 76 automatically adjusts the clearance 74 in response to physical events or thermal differences and expansion. Clearance 74 is adjusted by the tip 72 wearing away additional portions of the abradable coating 76 to an increased depth or to modify the path to correspond with blade rotation. Reducing clearance 74 between the tip 72 and the inner surface 78 of the casing 62 provides for an overall efficiency gain. It should be understood that although the disclosed example embodiment is explained in reference to a compressor section, a turbine section or other engine section including an interface between a rotating airfoil and an abradable coating would benefit from the system and methods of this disclosure. Moreover, any other component rotating relative to abradable coating such as for example a rotor rotating relative to a fixed vane in a compressor section would benefit from the system and methods of this disclosure and is within the contemplation of this disclosure.

Interaction between the airfoil tip 72 and the abradable coating can be estimated, but only measured once the engine is stopped and at least partially disassembled. The incursion rate of the tip 72 into the abradable coating 76 is a parameter that provides information that is indicative of improvements to engine operation and clearance. Moreover, the abrasion and wearing away of the abradable coating 76 may be a measurement utilized to trigger maintenance activities.

Figure 3:
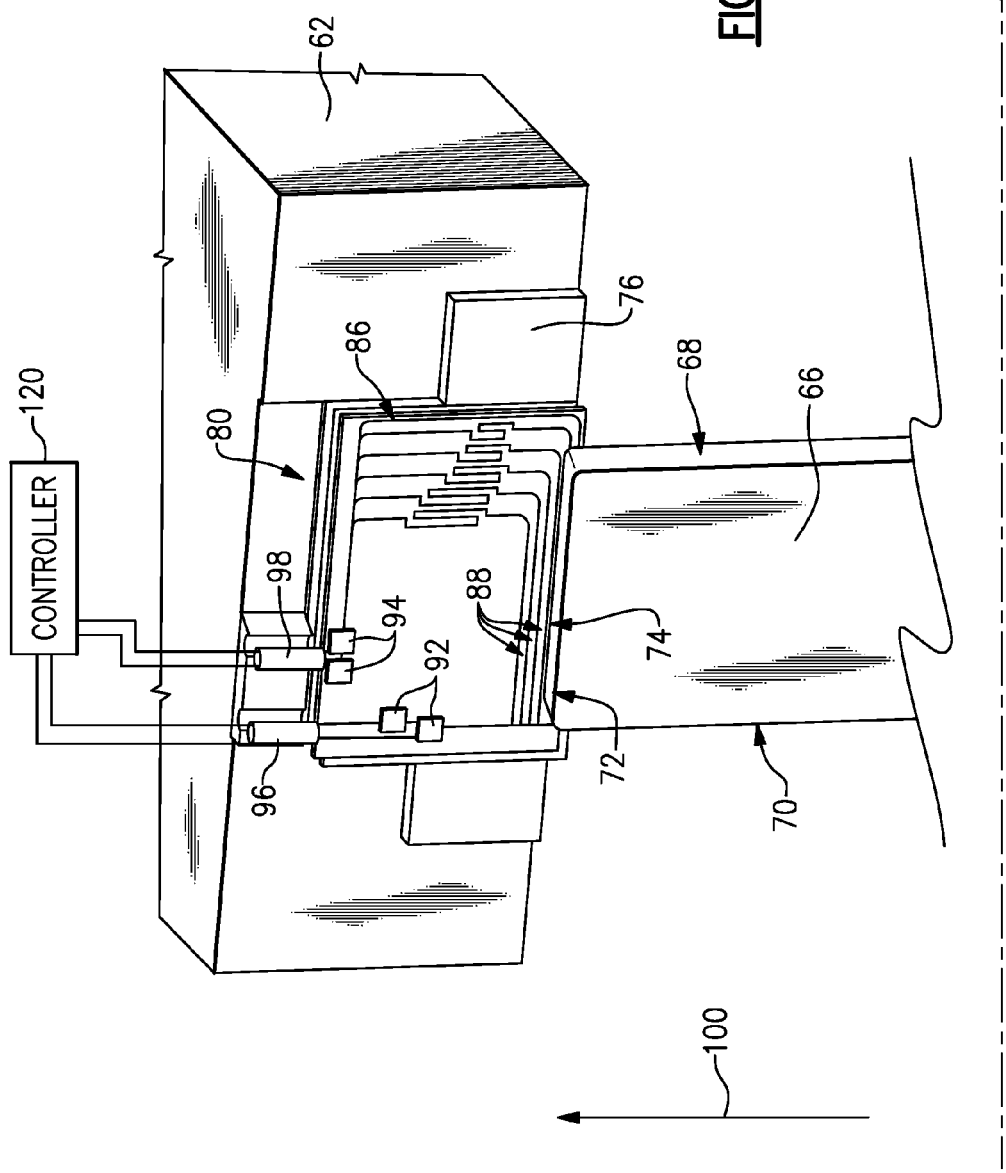
FIG. 3 is a schematic view of a wear monitoring system.
Figure 4:
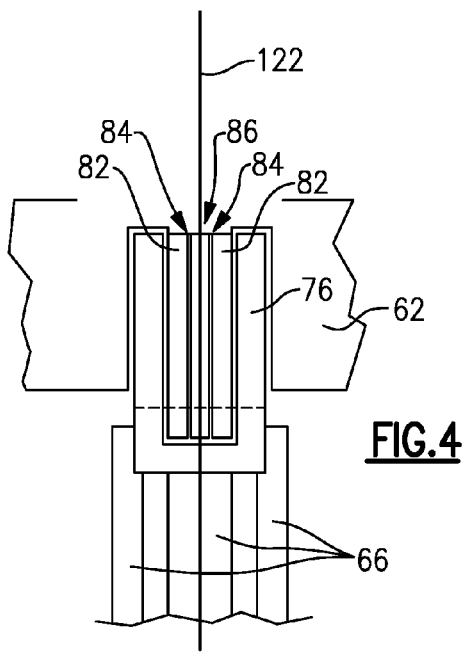
FIG. 4 is a schematic view of the example wear monitoring system.

Referring to FIGS. 3 and 4 with continued reference to FIG. 2, a disclosed wear monitoring system 80 includes a circuit 86 that is encapsulated within the abradable coating 76 disposed radially outward of the rotating airfoil 66. The airfoil tip 72 rotates proximate to the circuit 86 that is encapsulated within the abradable coating 76. The disclosed circuit 86 extends in a radial direction indicated by arrow 100 relative to the engine axis A. As the airfoil 66 rotates past the abradable coating 76 and wears portions of the abradable coating 76 away, portions of the circuit 86 are also worn away. The conductive leads 88 are in a path of the airfoil tip 72 and within the abradable coating 76. Rotation of the airfoil 66 causes the airfoil tip 72 to wear away portions of the abradable coating 76 and also portions of the circuit 86.

FIG. 4 illustrates circuit 86 encapsulated within the abradable coating 76. The circuit 86 is a printed circuit using direct write methods and is encapsulated within an encapsulation layer 84. An insulating layer 82 is provided between the encapsulation layer 84 including the circuit 86 and the abradable coating 76. Although the example embodiment includes an encapsulation layer 84, the abradable coating 76 may be sufficiently electrically insulating to not require a separate insulating layer 82. Moreover, additional encapsulation layers 84 and insulating layers may also be utilized within the contemplation of this disclosure. The example circuit 86 further includes pads 92 and 94 that are in electrical communication with probes 96 and 98. The probes 96 and 98 enable the measurement of an electrical characteristic of the circuit 86 responsive to incursion of the airfoil tip 72 due to wearing away or cutting of one or several of the conductive leads 88. A controller 120 is in communication with the probes 96 and 98 to receive information indicative of the current electrical characteristics of the circuit 86. Communication may be provided by a direct electrical connection or by a wireless communication link.

Figure 5:
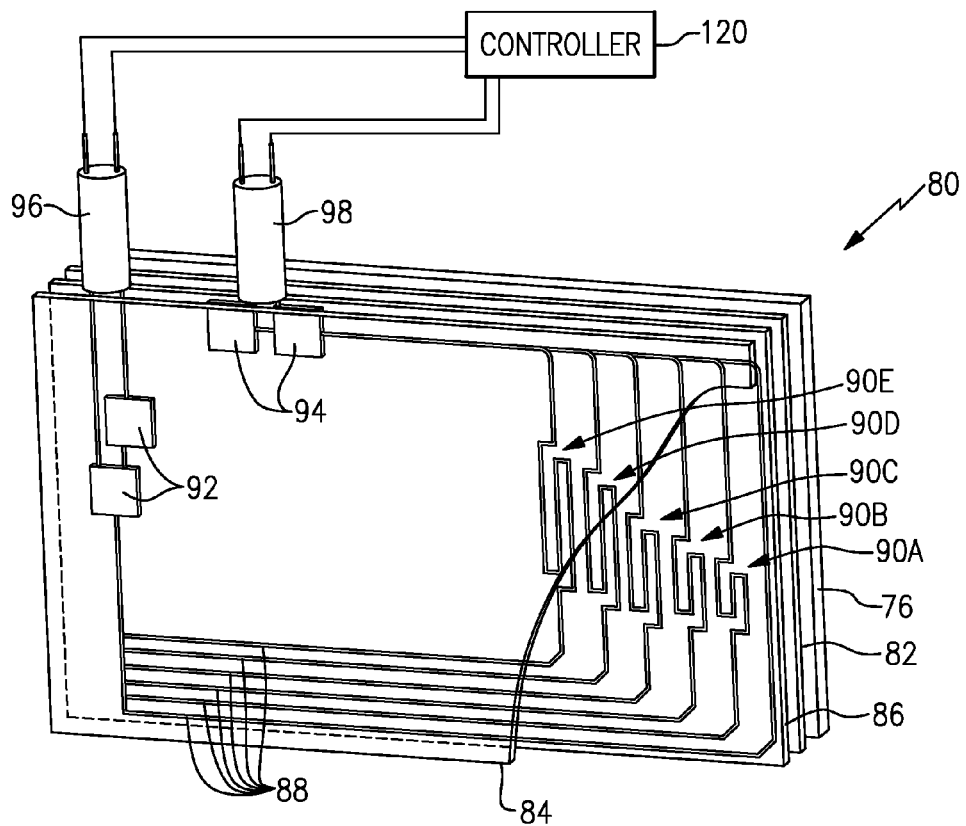
FIG. 5 is a perspective view of an example circuit of the wear monitoring system.

Referring to FIG. 5 with continued reference to FIG. 3, the circuit 86 includes a plurality of conductive leads 88 disposed proximate to the rotating tip 72. The conductive leads 88 are in electrical communication with a corresponding plurality of resistor elements 90a-e. The resistor elements 90a-e are in turn connected to the contact pads 92, 94 that enable measurements of changing electrical characteristics. In this example, voltage is measured for a given input current and varies responsive to a change in resistance as conductive leads 88 are severed.

During operation, the airfoil tip 72 interacts with the abradable coating 76 and wears portions of the abradable coating away including at least one or more of the embedded conductive leads 88. The conductive leads 88 within the worn away region are removed to create an open circuit corresponding with one of the plurality of resistor elements 90a-e. As additional ones of the conductive leads 88 are worn away, the electrical value changes and is an indication of the depth of the tip incursion into the abradable coating 76. As subsequent conductive leads 88 are worn away, the resistance of the circuit 86 will change and provide a varying electrical characteristic that corresponds with the depth of wear into the abradable coating 76.

The sensor circuit 86 extends in a radial plane 122 (Best shown in FIG. 4) from the inner surface 78 of the casing 62. The plurality of resistor elements 90a-e are disposed radially above the conductors 88 within that radial plane 122.

Figure 6:
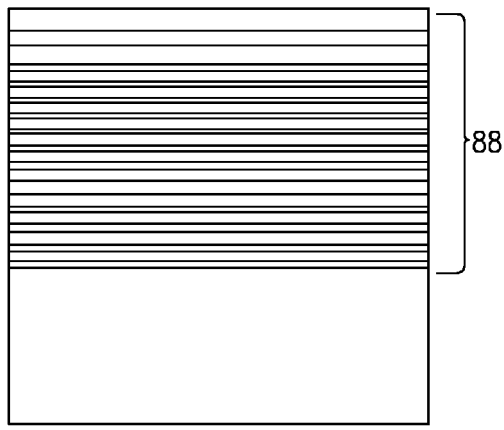
FIG. 6 is a schematic view of conductive leads of the example wear monitoring system.

Referring to FIG. 6 with continued reference to FIG. 5, the conductive leads 88 are of printed material that is deposited on the insulating layer 82 to define the circuit 86. The plurality of conductive leads 88 are disposed radially within and just outside of the path of rotation of the blade tips 72. The plurality of conductive leads 88 are disposed in electrical communication with a corresponding one of the resistor elements 90a-e. Each of the conductive leads 88 is in electrical communication with a separate one of the resistor elements 90a-e. The plurality of resistor elements 90a-e are arranged in parallel and the plurality of conductive leads 88 are equally and closely spaced apart from each other in a radial direction. The closer the spacing, the greater resolution of depth incursion into the abradable coating. Accordingly, the number of conductive leads 88 and spacing is selected to provide a desired accuracy and resolution. Each of the resistor elements 90a-e are also printed utilizing a resistive material. The overall length and cross section of each resistor element 90a-e of a uniform length provides the desired resistance value that corresponds with one of the conductive leads 88.

Figure 7:
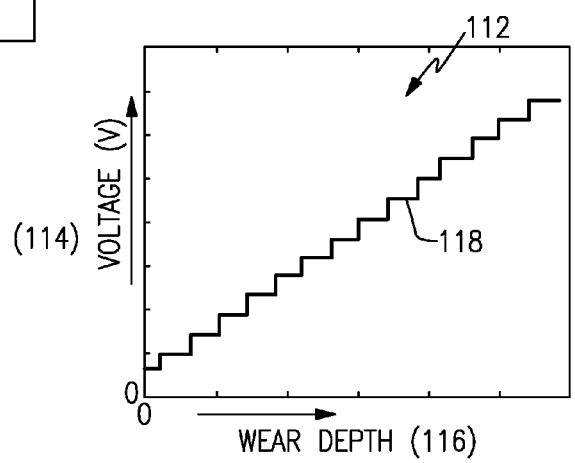
FIG. 7 is a graph illustrating a relationship between an electrical characteristic and wear depth.

Referring to FIG. 7, an example relationship between voltage 114 and wear depth 116 is illustrated by graph 112. The graph 112 illustrates a plurality of steps 118 that are substantially uniform. Each step 118 represents a cutting or severing of one of the conductive leads 88. As subsequent conductive leads are cut, the resistance and thereby the voltage 114 read by the controller 120 changes. The differing resistance values provided by varying the length of resistance material between the end pads 104 (FIG. 8) provides this stepwise function 118 that provides an accurate correspondence to a wear depth 116 into the abradable coating.

Moreover, the values of the resistor elements are determined to provide the illustrated uniform step change in voltage. In the disclosed embodiment a resistance value for each resistor element is determined according to a defined relationship. As the airfoil tip 72 interacts with the circuit 86 and removes a conductive lead 88 and thereby the corresponding one of the resistor elements 90a-e, the equivalent resistance is changed. The amount of change in voltage depends on the number of resistor elements 90a-e, the current source and the value of each resistor element 90a-e. In this example, the overall resistance decreases inversely with the number of resistor elements 90a-e remaining in the circuit 86. In this example, an equal amount of voltage change is provided with each cut conductive lead 88 by providing resistor elements with different values. One non-limiting embodiment of relative resistor element values includes a first resistor element with a value R, a second resistor element with a value $R*(N-1)$, a third resistor element with a value $R*(N-1)*(n-2)/N$, N-1 resistor element with a value $6*R/N$ and an Nth resistor element with a resistance value $2*R/N$, where N equal the number of resistor elements and conductive leads. As appreciated other resistor element values that provide a consistent uniform change in voltage are also within the contemplation of this disclosure. Moreover, although the example resistor elements are provided in a parallel configuration, other configurations are within the contemplation of this disclosure.

Figure 8:
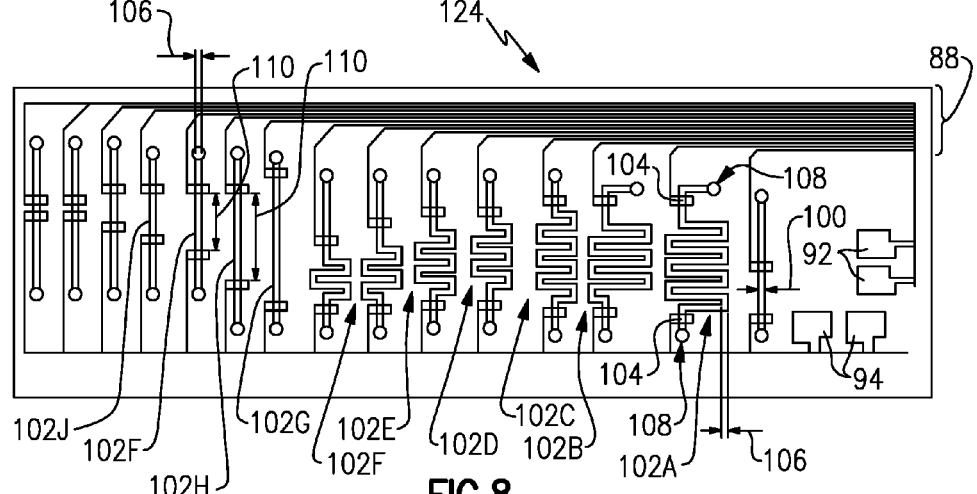
FIG. 8 is another sensor circuit of the wear monitoring system.

Referring to FIG. 8, another disclosed circuit 124 is shown and includes the conductive leads 88 printed onto a substrate and terminated at end pads 104. The end pads 104 are spaced apart such that a resistor element 102a-j may be formed there between. Each of the conductive leads 88 corresponds with a specific one of the resistor elements 102a-j. Each of the resistor elements 102a-j is of a different value. The different values of resistance provides for a step wise function that changes the electrical characteristic uniformly to enable a correlation between changes in electrical characteristics and an incursion depth of the airfoil tip 72 into the abradable coating 76.

The plurality of resistor elements 102a-j is also printed using resistive material. In one disclosed example, the resistor element material contains Ruthenium. Other resistor element materials could also be utilized within the contemplation of this disclosure. The resistor element materials may be selected to accommodate operating conditions of a section of the engine. The resistor element material and conductive leads are deposited using known material deposition techniques, including aerosol jet printing, micro-thermal spray, ink jet printing, screen printing, extrusion printing along with other appropriate processes. As appreciated, the process of depositing electrical material onto a substrate does not necessarily provide a desired uniform width along the entire surface. Start and end portions indicated at 108 will often provide a non-uniform cross section that can detrimentally affect the desired consistence of the resistance value.

Accordingly, the disclosed resistance material is deposited at a start point 108 prior to the electrical lead end pads 104. The volume of resistive material between the lead end pads 104 provides the desired resistance that corresponds with each of the plurality of conductive leads 88. The resistance value for each of the resistor elements is a function of a volume of resistor element material provided by a cross section 106 along with the length 110. In this example, each of the resistor elements 102a-j includes a common cross section 106 and the resistance value is varied by varying a length 110 of the resistor element material deposited between the lead end pads 104. The cross section 106 is controlled by the printing process parameters and material rheology. Resistance material may be a single straight line between the lead end pads 104 or may comprise a series of loops that provide a desired overall length that corresponds with the desired resistance. The specific configuration of the resistance values for the circuit provides for a substantially uniform and a consistent change in voltage for the circuit 124 that enables a more accurate and simplified correspondence to the depth of incursion of the blade into the abradable material 76.

The example wear sensing system may be utilized as part of initial testing and verification of an engine but is also contemplated to be part of an in-situ system that can provide information to trigger maintenance functions or even to alert an aircraft operator or pilot of specific wear depths that may be relevant to overall engine operation.

Accordingly, the example wear sensor system provides an in-situ evaluation and monitoring of blade tip incursion into abradable coating circumscribing airfoils within the compressor, turbine, or fan sections of a gas turbine engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A wear monitoring system for measuring incursion depth into an abradable coating comprising:
   a layer of abradable coating including a depth;
   at least one measurement circuit including a plurality of conductive leads disposed within the abradable coating, the conductive leads spaced radially apart within a common radial plane corresponding to the depth of the abradable coating; and
   a plurality of resistor elements corresponding with the plurality of conductive leads, each of the plurality of resistor elements in electrical communication with one of the plurality of conductive leads disposed within the common radial plane of the corresponding one of the plurality of conductive leads; wherein an electrical characteristic of the circuit varies responsive to cutting of one or more of the plurality of conductive leads by a passing airfoil.

2. The wear monitoring system as recited in claim 1, wherein each of the plurality of resistor elements are arranged in parallel.

3. The wear monitoring system as recited in claim 2, wherein at least two of the plurality of resistor elements provide a different resistance.

4. The wear monitoring system as recited in claim 2, including at least two probes in electrical communication with the plurality of conductive leads and the corresponding plurality of resistor elements.

5. The wear monitoring system as recited in claim 1, wherein each of the resistor elements comprises a resistor element material dispersed between end leads corresponding with the corresponding one of the plurality of conductive leads.

6. The wear monitoring system as recited in claim 5, wherein a volume of the resistor element material between the end leads is varied to define a resistance value for each of the plurality of resistor elements.

7. The wear monitoring system as recited in claim 6, wherein the resistor element material between the end leads defines a uniform cross-section and a portion of resistor element materials with a non-uniform cross-section extends past each of the end leads.

8. The wear monitoring system as recited in claim 1, wherein the measurement circuit is formed on an insulating layer and an encapsulating layer is applied over the measurement circuit, wherein each of the insulating layer, measurement circuit and encapsulating layers are disposed within separate and parallel radially extending planes.

9. The wear monitoring system as recited in claim 1, including a controller in communication with the measurement circuit that receives information indicative of an incursion of an airfoil into the radial depth of the abradable material.

10. A gas turbine engine comprising:
    a fan including a plurality of fan blades rotatable about an axis;
    a compressor section;
    a combustor in fluid communication with the compressor section;
    a turbine section in fluid communication with the combustor, wherein at least one of the compressor section and the turbine section includes an airfoil having a tip;
    an abradable coating that wears away responsive to incursion of the tip to define a desired clearance; and
    a wear sensor system comprising at least one measurement circuit including a plurality of conductive leads disposed within the abradable coating, the conductive leads spaced radially apart within a common radial plane corresponding to the depth of the abradable coating, and a plurality of resistor elements corresponding with the plurality of conductive leads, each of the plurality of resistor elements in electrical communication with one of the plurality of conductive leads and disposed within the common radial plane of the corresponding one of the plurality of conductive leads, wherein an electrical characteristic of the at least one measurement circuit varies responsive to cutting of one or more of the plurality of conductive leads by the tip.

11. The gas turbine engine as recited in claim 10, wherein each of the plurality of resistor elements are arranged in parallel.

12. The gas turbine engine as recited in claim 10, wherein at least two of the plurality of resistor elements provide a different resistance.

13. The gas turbine engine as recited in claim 10, including at least two probes in electrical communication with the plurality of conductive leads and the corresponding plurality of resistor elements.

14. The gas turbine engine as recited in claim 10, wherein each of the resistor elements comprises a resistor element material dispersed between end leads corresponding with the corresponding one of the plurality of conductive leads.

15. The gas turbine engine as recited in claim 14, wherein a volume of the resistor element material between the end leads is varied to define a resistance value for each of the plurality of resistor elements.

16. The gas turbine engine as recited in claim 15, wherein the resistor element material between the end leads defines a uniform cross-section and a portion of resistor element materials with a non-uniform cross-section extends past each of the end leads.

17. The gas turbine engine as recited in claim 10, wherein the measurement circuit is formed on an insulating layer applied over the abradable material and an encapsulating layer is applied over the measurement circuit, wherein each of the insulating layer, measurement circuit and encapsulating layers are disposed within separate and parallel radially extending planes.

18. The gas turbine engine as recited in claim 10, including a controller in communication with the measurement circuit that receives information indicative of an incursion of an airfoil into the radial depth of the abradable material.

19. A method of assembling a wear sensor system for monitoring wear of an abradable coating comprising:
- applying a layer of abradable coating to a desired radial depth proximate an airfoil;
- forming a plurality of conductive leads disposed within the abradable coating, the conductive leads spaced radially apart within a common radial plane corresponding to the radial depth of the abradable coating;
- assembling a plurality of resistor elements corresponding with the plurality of conductive leads, each of the plurality of resistor elements in electrical communication with one of the plurality of conductive leads and disposed radially outward within the common radial plane of the corresponding one of the plurality of conductive leads; and
- providing probes in electrical communication with the plurality of conductive leads and the plurality of resistor elements such that an electrical characteristic varies responsive to cutting of one or more of the plurality of conductive leads by an airfoil and that the electrical characteristic is indicative of a depth at which the airfoil has penetrated the radial depth of the abradable coating.

20. The method as recited in claim 19, comprising applying of an insulating coating onto the abradable coating along a radial plane and forming the plurality of conductive leads and the plurality of resistor elements onto the insulating coating.

21. The method as recited in claim 20, including applying an encapsulating coating over the plurality of conductive leads and the plurality of resistor elements.

22. The method as recited in claim 21 including defining each of the resistor elements with a resistor element material dispersed between end leads corresponding with the corresponding one of the plurality of conductive leads.

23. The method as recited in claim 22, wherein a volume of the resistor element material between the end leads is varied to define a resistance value for each of the plurality of resistor elements.

24. The method as recited in claim 22, wherein the resistor element material between the end leads defines a uniform width and a portion of resistor element materials with a non-uniform width extends past each of the end leads.

* * * * *